United States Patent
Maruyama (10) Patent No.: US 9,180,811 B2
(45) Date of Patent: Nov. 10, 2015

(54) VEHICLE ROOM LIGHTING DEVICE

(75) Inventor: Isao Maruyama, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 226 days.

(21) Appl. No.: 13/073,349

(22) Filed: Mar. 28, 2011

(65) Prior Publication Data

US 2011/0242832 A1      Oct. 6, 2011

(30) Foreign Application Priority Data

Apr. 2, 2010  (JP) ................................. 2010-086212

(51) Int. Cl.
| | |
|---|---|
| B60Q 1/00 | (2006.01) |
| B60Q 1/26 | (2006.01) |
| B60Q 3/02 | (2006.01) |
| H01H 23/02 | (2006.01) |

(52) U.S. Cl.
CPC ........... *B60Q 3/0296* (2013.01); *H01H 23/025* (2013.01)

(58) Field of Classification Search
CPC ......... H01H 23/24; H01H 23/14; H01H 1/00; H01H 3/02; H01H 1/28; H01H 23/00
USPC ......... 362/487, 488, 490, 492, 493, 295, 394, 362/282, 284, 322, 324, 512
See application file for complete search history.

(56) References Cited

U.S. PATENT DOCUMENTS

| | | | |
|---|---|---|---|
| 3,053,337 A * | 9/1962 | Prohaska et al. ................ 180/90 |
| 3,811,043 A * | 5/1974 | Cope et al. .................... 362/489 |
| 4,123,634 A | 10/1978 | Hults |
| 4,811,180 A * | 3/1989 | Tsai et al. ..................... 362/512 |
| 5,412,165 A * | 5/1995 | Malone et al. ................ 200/5 R |
| 5,828,284 A * | 10/1998 | Huang ............................ 337/37 |
| 6,616,311 B2 * | 9/2003 | Soga et al. .................... 362/488 |
| 6,799,875 B2 * | 10/2004 | Flokstra et al. ............... 362/521 |
| 7,688,174 B2 * | 3/2010 | Hung .............................. 337/66 |
| 7,775,694 B2 * | 8/2010 | Nagai et al. .................... 362/490 |
| 2002/0067616 A1 | 6/2002 | Soga et al. |
| 2008/0041708 A1 | 2/2008 | James |
| 2009/0189542 A1 | 7/2009 | Wu et al. |

FOREIGN PATENT DOCUMENTS

| | | |
|---|---|---|
| DE | 295 19 317 U1 | 3/1996 |
| DE | 196 19 382 A1 | 11/1997 |
| FR | 2 868 873 A1 | 10/2005 |
| JP | 58-181634 U | 12/1983 |
| JP | 09-240368 A | 9/1997 |
| JP | 2002-172977 A | 6/2002 |
| JP | 2010-044899 A | 2/2010 |

\* cited by examiner

*Primary Examiner* — Mary Ellen Bowman
*Assistant Examiner* — Tsion Tumebo
(74) *Attorney, Agent, or Firm* — Foley & Lardner LLP (57) ABSTRACT

A vehicle room lighting device having a lamp housing 2 and a lamp lens 3. An elastic piece 12 having a predetermined elasticity in a direction of a rotary shaft O-O of the lamp lens 3 is provided at the lamp lens 3. A shaft portion 15 is provided at the elastic piece 12. A shaft hole 23 is provided at the lamp housing 2. The shaft portion 15 is inserted into the shaft hole 23 so as to be rotatable around the rotary shaft O-O of the lamp lens 3. The vehicle room lighting device is capable of rotatably mounting the lamp lens 3 on the lamp housing 2 without a backlash.

8 Claims, 9 Drawing Sheets

VEHICLE ROOM LIGHTING DEVICE

CROSS REFERENCE TO RELATED APPLICATIONS

This application claims priority of Japanese Patent Application No. 2010-086212 filed on Apr. 2, 2010. The contents of this application are incorporated herein by reference in their entirety.

BACKGROUND OF THE INVENTION

1. Field of the Invention

The present invention relates to a vehicle room lighting device (a vehicle room lamp) for rotationally operating a lamp lens and then making an operation of pushing a push switch to thereby cause a light source to be turned ON/OFF.

2. Description of the Related Art

A vehicle room lighting device of such type is conventionally known (for example, Japanese Utility Model Application Laid-open No. 58-181634). Hereinafter, a conventional vehicle room lighting device will be described. The conventional vehicle room lighting device is provided with: an edge which is arranged at the periphery of a housing; a bulb which is partitioned by the lens and the housing; and a lens which is arranged to enable tilting at a front face opening portion of the housing; and a push button switch which causes the bulb to be turned ON/OFF, wherein a pin portion of the lens is rotatably engaged with a recessed portion which is formed by the housing and the rim. When the lens is pushed, the lens rotates around the pin portion and then the rotating lens causes a push button switch to be turned ON/OFF (open/close), whereby the bulb is turned ON/OFF.

The vehicle room lighting device of such type causes the bulb to be turned ON/OFF by operating the push button switch to be turned ON/OFF through a rotating operation of the lens, and thus, the rotating operation of the lens needs to be precious. Therefore, in the vehicle room lighting device of such type, it has been important to rotatably mount the lens on the housing without a backlash.

SUMMARY OF THE INVENTION

The present invention has been made in view of the above-described circumstance that, in the conventional vehicle room lighting device of such type, it has been important to rotatably mount the lens on the housing without a backlash.

A first aspect of the present invention is characterized in that: an elastic piece having a predetermined elasticity is provided at a lamp lens in a rotary shaft direction of the lamp lens; a shaft portion is provided at the elastic piece; a shaft hole is provided at the lamp housing; and the shaft portion is rotatably inserted into the shaft hole around a rotary shaft of the lamp lens.

In addition, a second aspect of the present invention is characterized in that a first wall thinning hole is provided at the elastic piece.

Further, a third aspect of the present invention is characterized in that: the lamp housing is formed in a sectional recessed shape of which one side opens and the other side closes; the shaft hole is provided at least either one of edges which are opposed to each other at an opening portion of the lamp housing; the lamp lens is formed in a sectional recessed shape of which one side closes and the other side opens; a closed portion of the lamp lens closes the opening portion of the lamp housing and then the lamp room is partitioned; the elastic piece is integrally provided at least either one of the edges which are opposite to each other at the opening portion of the lamp lens; and at the shaft portion, an abutment face is provided which elastically abuts against the edge at the opening portion of the lamp housing when the shaft portion is positioned in a range from the opening portion of the lamp housing to the shaft hole.

Furthermore, a fourth aspect of the present invention is characterized in that, at a site from the opening portion to the shaft hole of the lamp housing, a guide protrusion portion for guiding the shaft portion to be positioned in a range from the opening portion of the lamp housing to the shaft hole is integrally provided so as to be protruded inside in the rotary shaft direction of the lamp lens.

Still furthermore, a fifth aspect of the present invention is characterized in that a second wall thinning hole is provided at a central part of the shaft portion.

Yet furthermore, a sixth aspect of the present invention is characterized in that: the shaft portion is formed in a sectional circular shape; and a first portion formed in a sectional semicircular shape and a second portion formed in a sectional semicircular shape are combined with each other to thereby form a sectional circular shape.

In the vehicle room lighting device according to the first aspect of the present invention, even if a difference between an internal diameter dimension of a shaft hole of a lamp housing and an external dimension of a shaft portion of a lamp lens is reduced to its required minimum by means of the elasticity in rotary shaft direction of the lamp lens of an elastic piece, the shaft portion of the lamp lens can be rotatably inserted into the shaft hole of the lamp housing, so that the lamp lens can be rotatably mounted on the lamp housing without a backlash.

Moreover, in the vehicle room lighting device according to the first aspect of the present invention, a shaft hole is provided at a lamp housing; an elastic piece is provided at a lamp lens; and a shaft portion is provided at the elastic piece, so that parts are made of the lamp housing and the lamp lens. Therefore, the number of parts can be reduced and manufacturing cost can be reduced accordingly.

In addition, in a vehicle room lighting device according to a second embodiment of the present invention, rigidity of an elastic piece is lowered by means of a first wall thinning hole which is provided at an elastic piece, and its elasticity is enhanced accordingly. Therefore, a lamp lens can be rotatably mounted on a lamp housing without a backlash.

Further, in a vehicle room lighting device according to a third embodiment of the present invention, when a shaft portion of a lamp lens is positioned in a range from an opening portion of a lamp housing to a shaft hole, an abutment face of the shaft portion elastically abuts against an edge of the opening of the lamp housing. Therefore, in particular, no damage is imparted to a lamp housing comprised of a member made of a soft material, in contrast with a lamp lens comprised of a member made of a hard material, or alternatively, both of the lamp housing and lamp lens. As a result, the vehicle room lighting device according to the third embodiment of the present invention is capable of preventing lowering of appearance due to damage and is capable of restraining a backlash between the shaft hole of the lamp housing and the shaft portion of the lamp lens due to the damage, and further, is capable of rotatably mounting the lamp lens on the lamp housing without a backlash.

Furthermore, in a vehicle room lighting device according to a fourth aspect of the present invention, even if a difference between an internal diameter dimension of a shaft hole of a lamp housing and an external dimension of a shaft portion of a lamp lens is reduced to its required minimum by means of a guide protrusive portion, the shaft portion of the lamp lens can be positioned easily, reliably, and preciously in a range from an opening portion of the lamp housing to the shaft hole. Therefore, the shaft portion of the lamp lens can be rotatably inserted into the shaft hole of the lamp housing without a backlash and then the lamp lens can be rotatably mounted on the lamp housing without a backlash.

Moreover, in the vehicle room lighting device according to the fourth aspect of the present invention, a guide protrusion portion of a lamp housing is provided so as to be protruded in a rotary shaft direction of a lamp lens, so that the guide protrusion portion of the lamp housing abuts against in the rotary shaft direction of the lamp lens, enabling the lamp lens to be rotatably mounted on the lamp housing without a backlash.

Furthermore, in a vehicle room lighting device according to a fifth aspect of the present invention, a thickness of an elastic piece of a lamp lens and a thickness of a shaft portion can be made substantially uniform by means of a second wall thinning hole which is provided at a center part of the shaft portion, so that at the time of ejection molding of the lamp lens, a resin can be substantially equally fed to an elastic piece of the lamp lens and the shaft portion. As a result, the vehicle room lighting device according to the fifth aspect of the present invention is capable of preventing deformation or shrinkage from occurring on a surface of the shaft portion. Therefore, the lamp lens can be rotatably mounted on a lamp housing without a backlash.

Still furthermore, in a vehicle room lighting device according to a sixth aspect of the present invention, by means for solving the above-described problem, a shaft hole of a lamp housing can be molded by a wall cutting die instead of a slide die, so that a shaft hole having an elongated depth can be molded. As a result, the vehicle room lighting device according to the sixth aspect of the present invention is capable of rotatably mounting a lamp lens on the lamp housing without a backlash by the elongated depth of the shaft hole.

DESCRIPTION OF THE PREFERRED EMBODIMENTS

Hereinafter, an exemplary embodiment of a vehicle room lighting device according to the present invention will be described in detail with reference to the drawings. It should be noted that the present invention is not limited by the exemplary embodiment.

Exemplary Embodiment (Description of Configuration)

Hereinafter, a configuration of a vehicle room lighting device in the embodiment will be described. In FIG. 1 to FIG. 5, reference numeral 1 designates a vehicle room lighting device. The vehicle room lighting device 1 in the embodiment is provided with a lamp housing 2, a lamp lens 3, a light source 4, and a push switch 5.

On the lamp housing 2, the lamp lens 3 is rotatably mounted around a rotary shaft O-O. A lamp room 6 is partitioned by the lamp housing 2 and the lamp lens 3. In the lamp room 6, the light source 4 and the push switch 5 are disposed, respectively.

The lamp lens 3 is an optically permeable member in this example, and is comprised of a comparatively hard material, for example, polycarbonate (PC). The lamp lens 3, as shown in FIG. 1 to FIG. 5, is formed in a sectional recessed shape of which one side closes and the other side opens. In other words, the lamp lens 3 is comprised of: a side wall portion 7 at an edge of an opening portion; and a top wall portion 8 at a closed portion.

Figure 1:
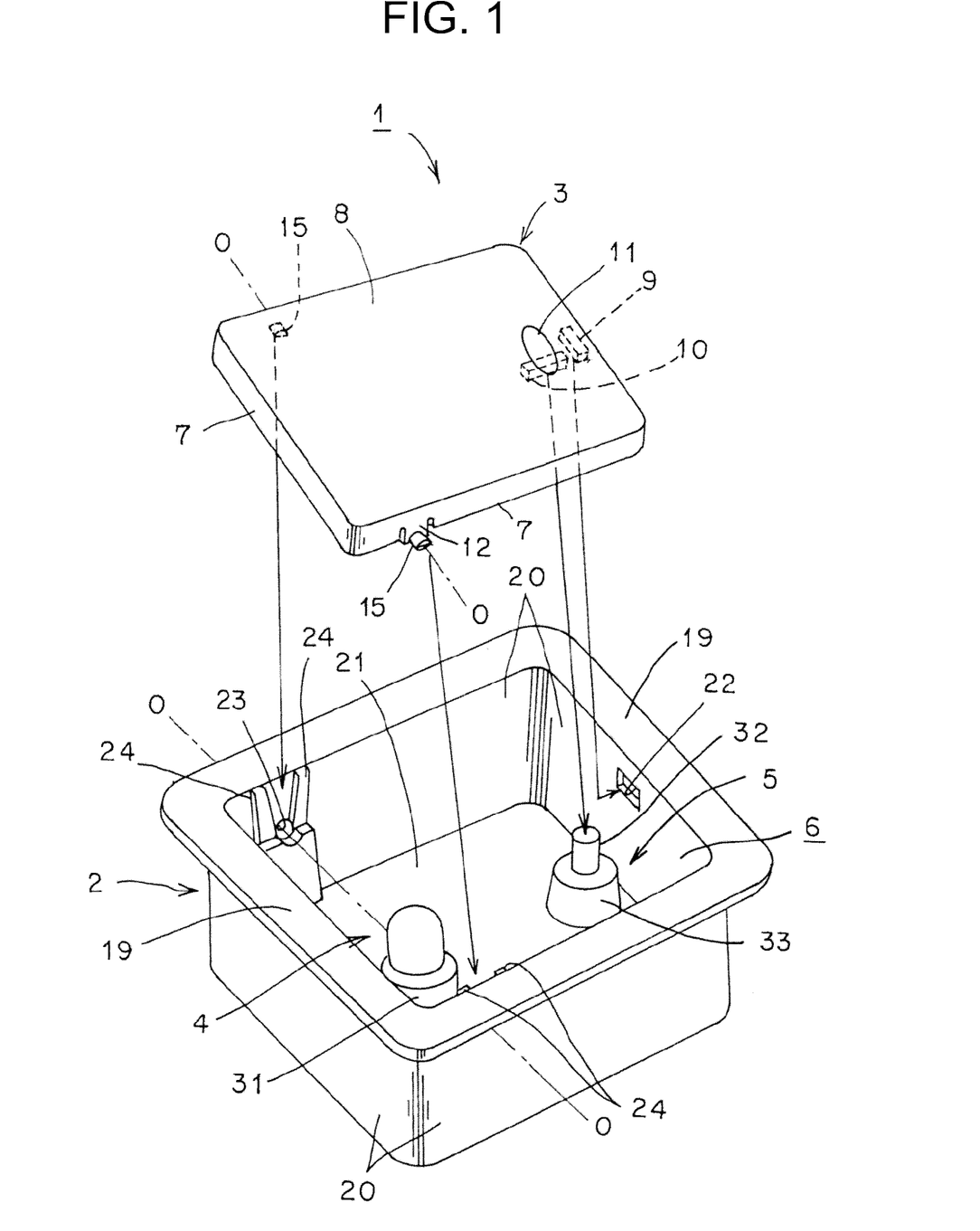
FIG. 1 shows an embodiment of a vehicle room lighting device according to the present invention and is an exploded perspective view showing an interrelationship between a lamp housing and a lamp lens.
Figure 2:
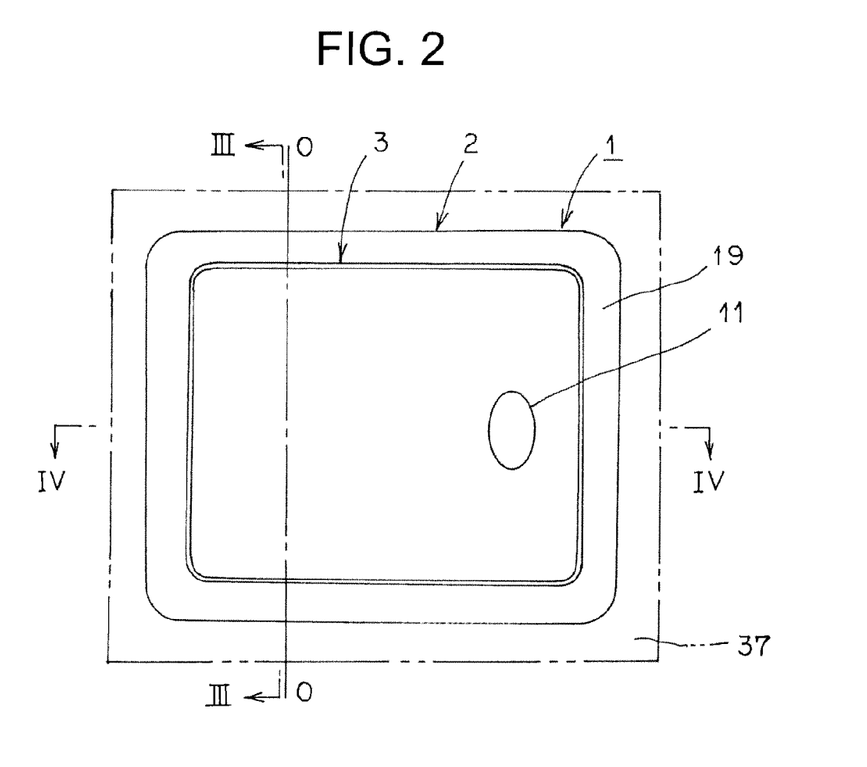
FIG. 2 is a bottom view showing a mount state, similarly.
Figure 3:
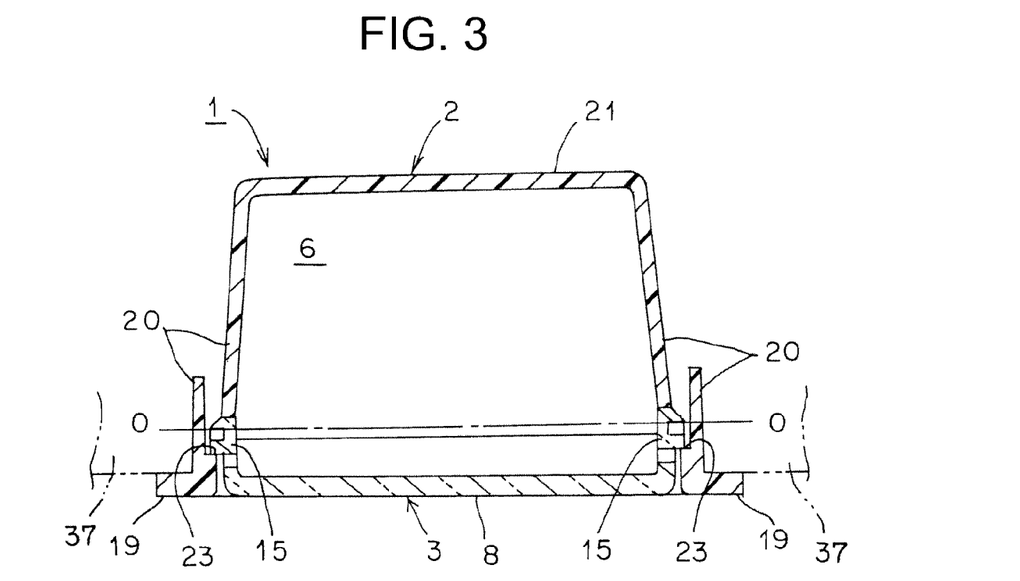
FIG. 3 is a sectional view taken along the line in FIG. 2, similarly.

In the side wall portion 7 of the lamp lens 3, at the side wall portion 7 in a direction which is orthogonal to the rotary shaft O-O, an engagement protrusion 9 is integrally provided so as to be protruded to the outside. In addition, in the top wall portion 8 of the lamp lens 3, a compression protrusion 10 is integrally provided at an end part in the direction which is orthogonal to the rotary shaft O-O and on an interior face of an end part at a side at which the engagement protrusion 9 is provided. In an exterior face of the top wall portion 8 of the lamp lens 3, a compression portion 11 serving as a recessed portion formed in a shallow elliptical shape is provided at a site corresponding to the compression protrusion 10.

In the side wall portion 7 of the lamp lens 3, two elastic pieces 12 each having a predetermined elasticity in the direction of the rotary shaft O-O are integrally provided at the side wall portion 7 in the direction of the rotary shaft O-O, the side wall portion 7 being at a side opposite to the one at which the engagement protrusion 9, the compression protrusion 10, and the compression portion 11 are positioned.

The elastic pieces 12, as shown in FIG. 6 and FIG. 8 to FIG. 11, are provided between two grooves 13 which are provided at the side wall portion 7 of the lamp lens 3. The elastic piece 12 is formed in a small rectangular shape. A first wall thinning hole 14 formed in a small rectangular shape is provided at a central part of the elastic piece 12.

At a center of a lower side of the elastic piece 12 and on an exterior face of the elastic piece 12, a shaft portion 15 is integrally provided so as to be protruded to the outside in the direction of the rotary shaft O-O. The shaft portion 15 is formed in a circular shape when it is seen in the direction of the rotary shaft O-O. A second wall thinning hole 16 formed in a semicircular shape is provided at a central part of the shaft portion 15. An upper portion than the second wall thinning hole 16 of the shaft portion 15 integrally communicates with the elastic piece 12. An abutment face 17 which serves as a tilt face is provided at a lower portion than the second wall thinning hole 16 of the shaft portion 15 from an external end face of the shaft portion 15. A boundary between an exterior face of the shaft portion 15 and the abutment face 17, as indicated by the double-dotted chain line in FIG. 6, tilts relative to the side wall portion 7 and the top wall portion 8 of the lamp lens 3.

Figure 6:
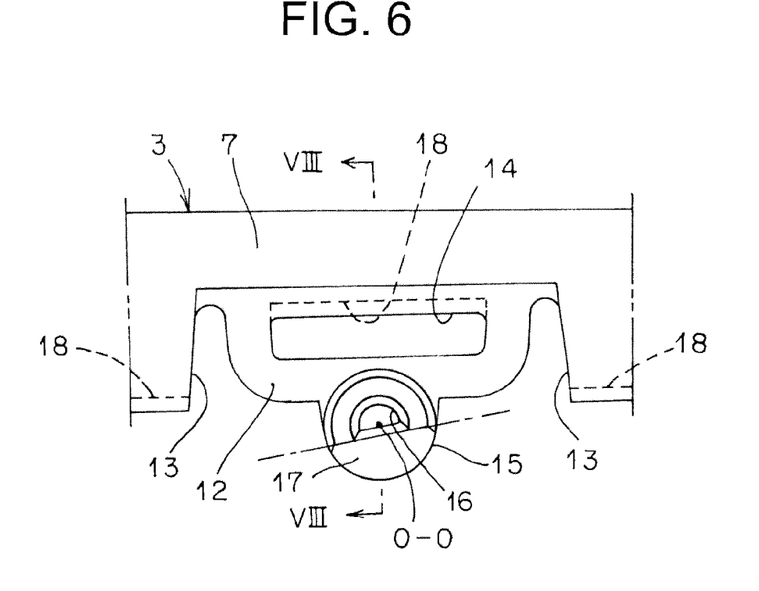
FIG. 6 is a partial side view showing an elastic piece and a shaft portion of a lamp lens, similarly.
Figure 7:
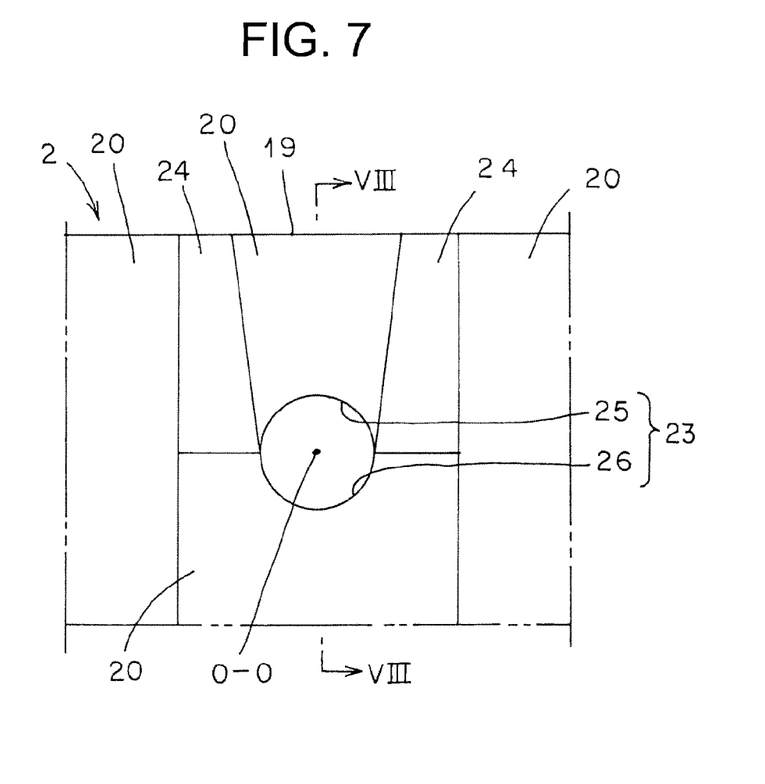
FIG. 7 is a partial side view showing a shaft hole and a guide protrusion portion of a lamp housing, similarly.

A roulette 18 is provided, as indicated by the dotted line in FIG. 6, on a respective one of a bottom face of the side wall portion 7 of the lamp lens 3 (a face opposite to the top wall portion 8) and on a top face of the first wall thinning hole 14 (a face at the side of the top wall portion 8).

The lamp housing 2 is an optically opaque member, and is comprised of a comparatively soft material, for example, polypropylene. The lamp housing 2, as shown in FIG. 1 to FIG. 5, is formed in a sectional recessed shape of which one side opens and the other side closes. In other words, the lamp housing 2 is comprised of: a flange portion 19 which is a peripheral edge part of an opening portion; a side wall portion 20 which is an edge part of the opening portion; and a bottom wall portion 21.

The light source 4 and the push switch 5 are mounted at both end parts in a direction which is orthogonal to the rotary shaft O-O of the bottom wall 20 of the lamp housing 2. In the side wall portion 20 of the lamp housing 2, an engagement portion 22 is provided at the side wall portion 20 in the direction that is orthogonal to the rotary shaft O-O, the side wall portion 20 being at a side at which the push switch 5 is positioned.

In the side wall portion 20 of the lamp housing 2, a shaft hole 23 and a guide protrusion portion 24 are provided, respectively, at the side wall portion 20 in the direction of the rotary shaft O-O, the side wall portion 20 being at an opposite side at which the light source 4 is positioned.

The shaft hole 23, as shown in FIG. 6 to FIG. 11, is formed in a sectional circular shape, i.e., in a circular shape when it is seen in the direction of the rotary shaft O-O. The shaft hole 23 is formed in a sectional circular shape which is obtained by combining a sectional semicircular shape, i.e., a first portion 25 formed in an upper semicircular shape, and a sectional semicircular shape, i.e., a second portion 26 formed in a lower semicircular shape, with each other. The shaft hole 23 is the one into which the shaft portion 15 is rotatably inserted around the rotary shaft O-O.

The guide protrusion portion 24 is integrally provided so as to be protruded to the inside in the direction of the rotary shaft O-O, at a site from an opening portion to the shaft hole 23, of the lamp housing 2, i.e., at a site from the flange portion 19 to the first portion 25 of the shaft hole 23. The guide protrusion portion 24 is provided in one pair at both sides of the shaft hole 23. A width between these two guide protrusion portions 24 is set at a maximum width in the flange portion 19; is gradually sandwiched from the flange portion 19 to the shaft hole 23; and is set at a minimum width at a boundary between the first portion 25 and the second portion 26, of the shaft hole 23 (which is equivalent to a diameter of the shaft hole 11 formed in a circular shape). The guide protrusion portion 24 is intended to guide the shaft portion 15 so as to be positioned at the opening portion of the lamp housing 2, i.e., from the flange portion 19 to the shaft hole 23.

Figure 12:
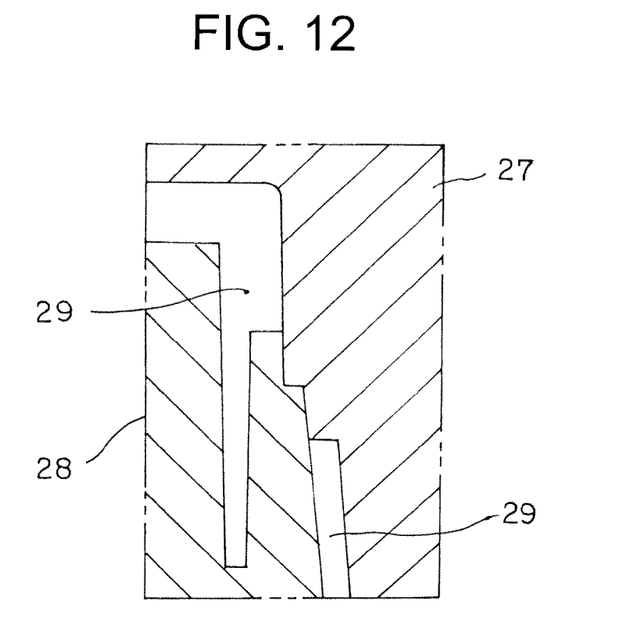
FIG. 12 is a sectional view showing a part of a wall cutting die for molding a portion of a shaft hole of a lamp housing, similarly.
Figure 13:
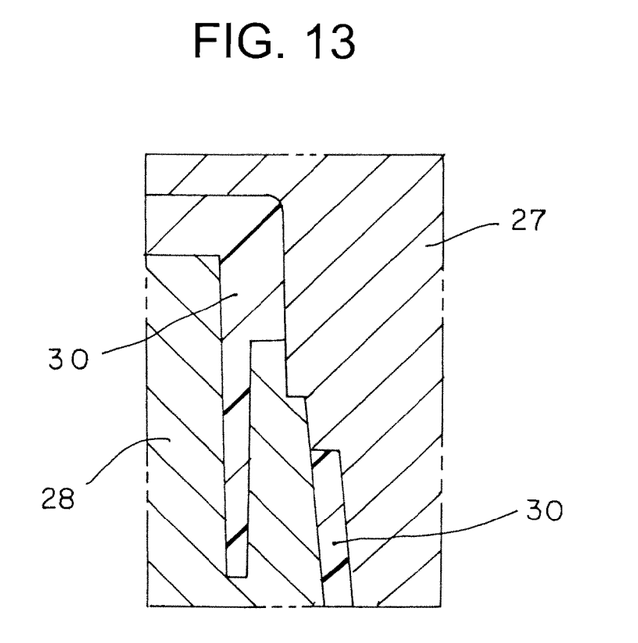
FIG. 13 is a partially sectional view of a wall butting die, the partially sectional view showing a state in which a portion of a shaft hole of a lamp housing is molded, similarly.
Figure 14:
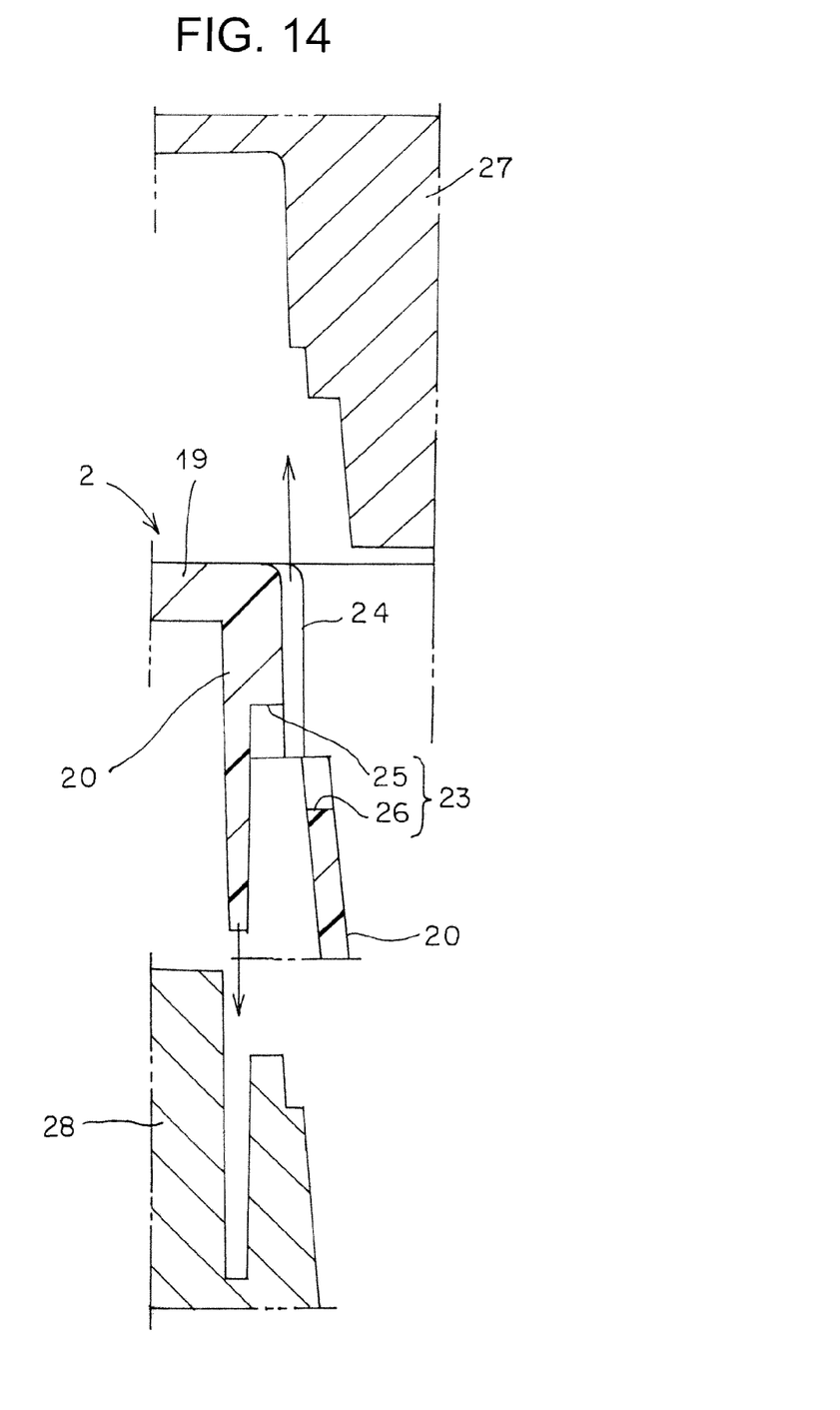
FIG. 14 is a partially sectional view of a wall cutting die, the partially sectional view showing a die opening state after a portion of a shaft hole of a lamp housing has been molded.

The lamp housing 2, as shown in FIG. 12 to FIG. 14, is molded with wall cutting dies 27, 28. In other words, as shown in FIG. 12, a cavity 29 is formed by closing the wall cutting dies 27, 28. As shown in FIG. 13, a resin 30 is fed into the cavity 29 of the wall cutting dies 27, 28. As shown in FIG. 14, the lamp housing 2, i.e., the flange 19, the side wall portion 20, the bottom wall portion 21, the engagement hole 22, the first portion 25 and the second portion 26 of the shaft hole 23, and the guide protrusion portion 24 are molded by opening the wall cutting dies 27, 28.

The light source 4 is an incandescent bulb such as a wedge bulb in this example (which may be a semiconductor type light source such as an LED or a light source such as a halogen bulb). The light source 4 is removably mounted on a socket 31. The socket 31 is removably mounted or fixed onto the bottom wall portion 21 of the lamp housing 2. The socket 31 is electrically connected to a power source (a battery), although not shown, via a harness (not shown) or a connector (not shown). As a result, the light source 4 is electrically connected to a power source via the socket 31.

The push switch 5 is comprised of an operating portion 32 and a main body portion 33. The operating portion 32 is slidably mounted on the main body portion 33, and is always biased in a state shown in FIGS. 1 and 4, i.e., in an outwardly protruding direction, by means of a spring (not shown) which is incorporated in the main body portion 33.

The main body portion 33 is removably mounted or fixed onto the bottom wall portion 21 of the lamp housing 2 so that the operating portion 32 is opposed to the compression protrusion 10 of the lamp lens 3. In the main body portion 33, a switch mechanism (not shown) which is turned ON/OFF (open/close) by means of an operation of pushing the operating portion 32 is incorporated together with the spring. The switch mechanism is electrically connected to the socket 32 of the light source 4 and a power source, via a harness (not shown) or a connector (not shown).

(Description of Mounting Lamp Lens on Lamp Housing)

Hereinafter, a mount procedure for mounting the lamp lens 3 on the lamp housing 2 will be described.

Figure 8:
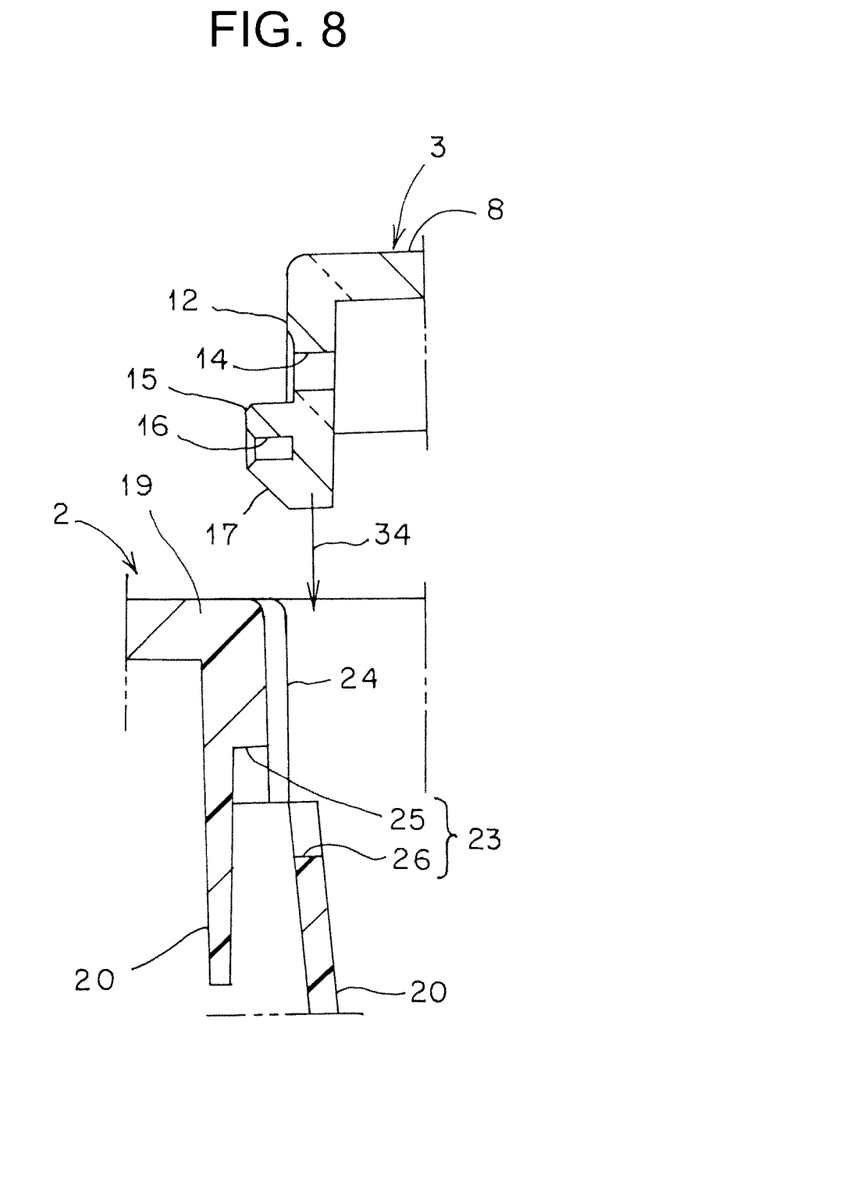
FIG. 8 is a sectional view obtained by combining the sectional view taken along the line VIII-VIII in FIG. 6 and the sectional view taken along the line VIII-VIII in FIG. 7, similarly.
Figure 9:
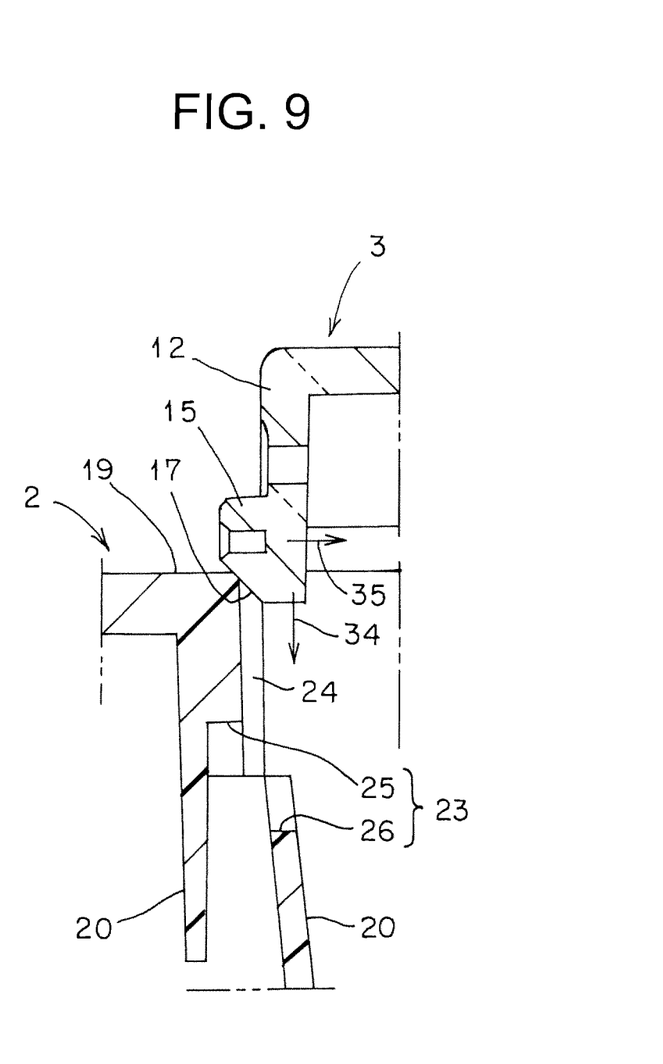
FIG. 9 is a sectional view which corresponds to that of FIG. 8, the sectional view showing a state in which an abutment face of a shaft portion of a lamp lens abuts against an edge part of a lamp housing, similarly.

First, the engagement protrusion 9 of the lamp lens 3 is engaged with the engagement hole 22 of the lamp housing 2. Next, as shown in FIG. 8, the shaft portion 15 of the lamp lens 3 is moved in the direction indicated by the solid arrow 34 and then is positioned between the two guide protrusion portions 24 of the lamp lens 2. Then, as shown in FIG. 9, the abutment face 17 at the shaft portion 15 of the lamp lens 3 elastically abuts against a corner part between the flange portion 19 and the side wall portion 20 at the lamp housing 2. At this time, a boundary between an exterior face and the abutment face 17 at the shaft portion 15 of the lamp lens 3, as indicated by the double-dotted chain line in FIG. 6, tilts relative to the side wall portion 7 and the top wall portion 8 at the lamp lens 3, so that the boundary is positioned in a state in which it is in contact with the corner portion between the flange portion 19 and the side wall portion 20 at the lamp housing 2 and then the lamp lens 3 is temporarily fixed to the lamp housing 2.

In the temporarily fixed state, there are two cases, a case in which the engagement protrusion 9 of the lamp lens 3 is engaged with the engagement hole 22 of the lamp housing 2 and then the two shaft portions 15 of the lamp lens 3 are temporarily fixed to the lamp housing 2 and a case in which the engagement protrusion 9 of the lamp lens 3 is engaged with the engagement hole 22 of the lamp housing 2 and one of the shaft portions 15 of the lamp lens 3 is inserted into the shaft hole 23 of the lamp housing 2 and then the remaining one of the shaft portions 15 of the lamp lens 3 is temporarily fixed to the lamp housing 2.

Figure 10:
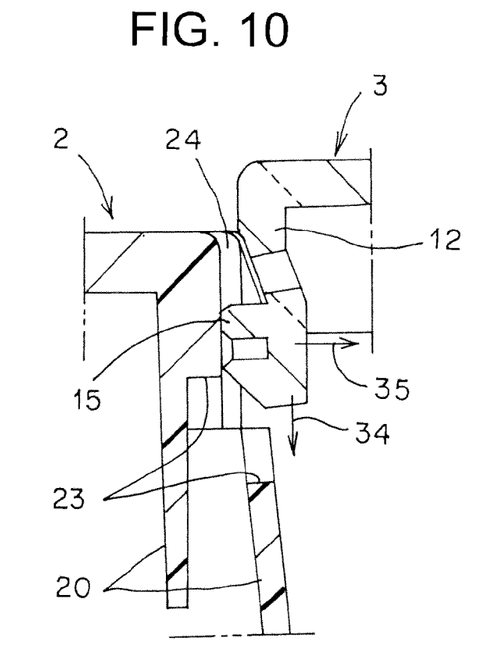
FIG. 10 is a sectional view which corresponds to that of FIG. 8, the sectional view showing a state in which a shaft portion of a lamp lens is guided to a guide protrusion portion of a lamp housing and an elastic piece of the lamp lens is elastically deformed, similarly.
Figure 11:
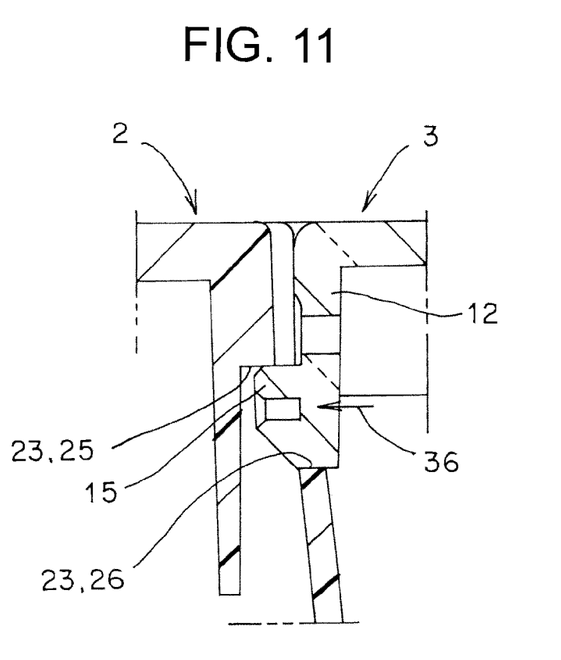
FIG. 11 is a sectional view which corresponds to that of FIG. 8, the sectional view showing a state in which a shaft portion of a lamp lens is inserted into a shaft hole of a lamp housing, similarly.

In the temporarily fixed state, as shown in FIG. 9, the shaft portion 15 of the lamp lens 3 is pushed into the shaft hole 23 side of the lamp housing 2 in the direction indicated by the solid arrow 34. Then, as shown in FIG. 10, the elastic piece 12 of the lamp lens 3 is elastically deformed in the direction indicated by the solid arrow 35 and an exterior face at the shaft portion 15 of the lamp lens 3 elastically abuts against an interior face at the side wall portion 20 between the two guide protrusion portions 24 of the lamp housing 2. In this state, the shaft portion 15 of the lamp lens 3 moves to the shaft hole 23 side of the lamp housing 2 in the direction indicated by the solid arrow 34 while the shaft portion is guided by means of the two guide protrusion portions 24 of the lamp housing 2.

At a time point when the shaft portion 15 of the lamp lens 3 is positioned in the shaft hole 23 of the lamp housing 2, the elastic piece 12 of the lamp lens 3, the elastic piece having been elastically deformed, is elastically restored in the direction indicated by the solid arrow 36. Then, the shaft portion 15 of the lamp lens 3 engages into the shaft hole 23 of the lamp housing 2. As a result, the lamp lens 3 is mounted rotatably and removably around a rotary shaft O-O on the lamp housing 2.

As described previously, the lamp lens 3 is mounted on the lamp housing 2. Then, the vehicle room lighting device 1 according to the exemplary embodiment, as shown in FIG. 2 to FIG. 5, is mounted on a ceiling or wall 37 (which is indicated by the double-dotted chain line in FIG. 2 to FIG. 5).

(Description of Functions)

The vehicle room lighting device 1 according to the exemplary embodiment is made of the constituent elements described above. Hereinafter, functions of this lighting device will be described.

Figure 5:
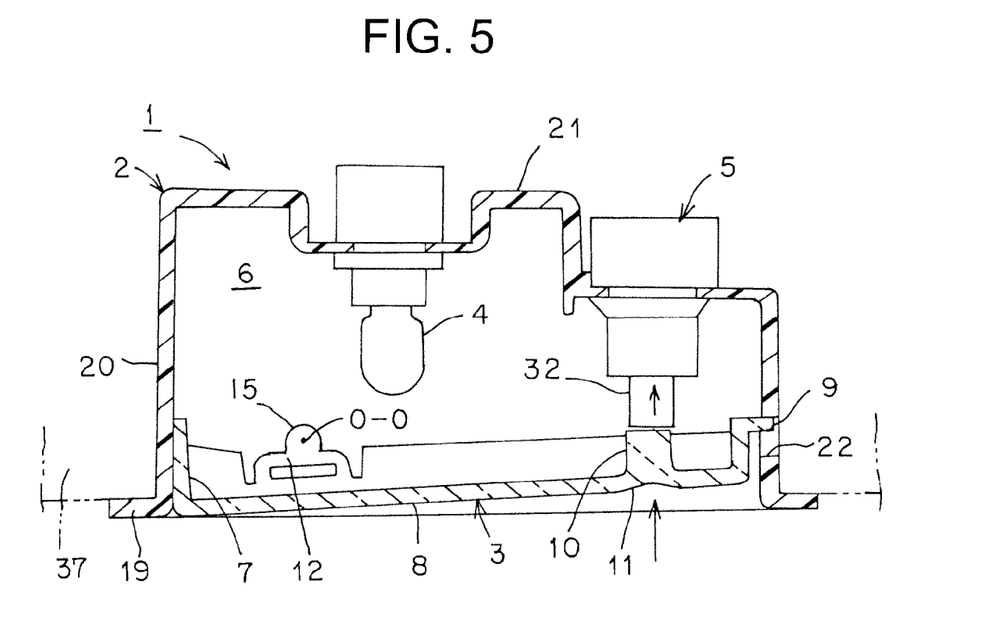
FIG. 5 is a sectional view taken along the line IV-IV in FIG. 2, the sectional view showing a state in which a push switch is subjected to a pushing operation, similarly.

First, as indicated by the solid arrow in FIG. 5, a compression portion 11 of a lamp lens 3 is pushed. Then, the lamp lens 3 rotates around a rotary shaft O-O relative to a lamp housing 2. This lamp lens 3 rotates, whereby a compression protrusion 10 of the lamp lens 3 pushes an operating portion 32 of a push switch 5 against a spring force of a spring of the push switch 5. A light source 4 is turned ON by one pushing operation of this operating portion 32. The light from the light source 4 passes through the lamp lens 3 and then illuminates the inside of a vehicle room (not shown).

Figure 4:
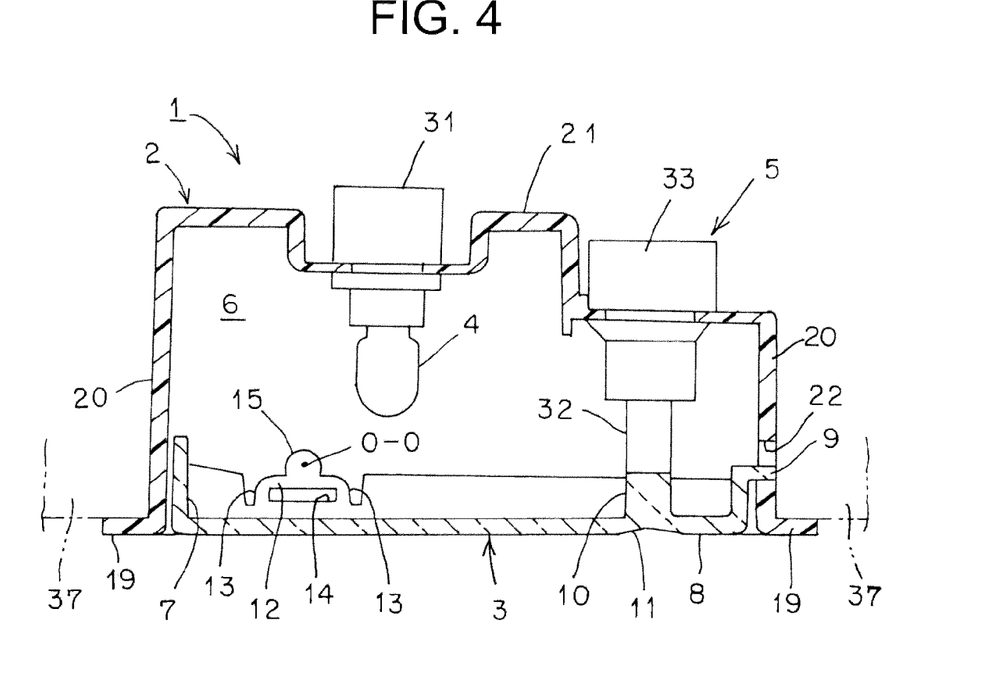
FIG. 4 is a sectional view taken along the line IV-IV in FIG. 2, similarly.

When the pushing operation at the compression portion 11 of the lamp lens 3 is released, the operating portion 32 of the push switch 5 returns from the state shown in FIG. 5 to its original state shown in FIG. 4 by means of the spring force of the spring. At this time, the lamp lens 3 also returns to its original state.

Then, when the compression portion 11 of the lamp lens 3 is pushed again, the lamp lens 3 rotates around the rotary shaft O-O relative to the lamp housing 2 and then the compression protrusion 10 of the lamp lens 3 pushes the operating portion 32 of the push switch 5 again. The light source 4 is turned OFF by means of this pushing operation of the operating portion 32 again. When the pushing operation of the compression portion 11 is released, the operating portion 32 of the push switch 5 and the lamp lens 3 return to their original states.

(Description of Advantageous Effects)

The vehicle room lighting device 1 according to the exemplary embodiment is made of the constituent elements and functions described above. Hereinafter, advantageous effects of this lighting device will be described.

According to the vehicle room lighting device 1 in the exemplary embodiment, even if a difference between an internal diameter dimension of a shaft hole 23 of a lamp housing 2 (a first portion 25 and a second portion 26) and an external dimension of a shaft portion 15 of a lamp lens 3 is reduced to its required minimum by means of the elasticity in the direction indicated by a rotary shaft O-O at the lamp lens 3 of an elastic piece 12, the shaft portion 15 of the lamp lens 3 can be rotatably inserted into a shaft hole 23 of the lamp housing 2, so that the lamp lens 3 can be rotatably mounted on the lamp housing 2 without a backlash. In particular, the difference between the internal diameter dimension of the shaft hole 23 at the lamp housing 2 and the external dimension of the shaft portion 15 at the lamp lens 3 can be reduced to its required minimum, so that a backlash in the direction that is orthogonal to the rotary shaft O-O of the lamp lens 3 can be restrained to its required minimum.

Moreover, according to the vehicle room lighting device 1 in the exemplary embodiment, the shaft hole 23 is provided at the lamp housing 2; the elastic piece 12 is provided at the lamp lens 3; and the shaft portion 15 is provided at the elastic piece 12, so that parts are made of the lamp housing 2 and the lamp lens 3 including the light source 4 and the push switch 5. Therefore, the number of parts can be reduced and manufacturing cost can be reduced accordingly.

In addition, according to the vehicle room lighting device 1 in the exemplary embodiment, rigidity of the elastic piece 12 is lowered by means of a first wall thinning hole 14, and the relevant elasticity is enhanced accordingly. Therefore, the lamp lens 3 can be further rotatably mounted on the lamp housing 2 without a backlash.

Further, according to the vehicle room lighting device 1 in the exemplary embodiment, when a shaft portion 15 of a lamp lens 3 is positioned in a range from an opening portion of a lamp housing 2 to a shaft hole 23, an abutment face 17 of the shaft hole 15 elastically abuts against an edge at the opening portion of the lamp housing 2, i.e., at a corner part between a flange portion 19 and a side wall portion 20. Therefore, in particular, there is imparted no damage to the lamp housing 2 comprised of a member made of a soft material, in contrast with the lamp lens 3 comprised of a material made of a hard material, or alternatively, both of the lamp housing 2 and the lamp lens 3. As a result, the vehicle room lighting device 1 in the exemplary embodiment is capable of preventing lowering of an appearance due to damage and is capable of restraining a backlash between the shaft hole 23 of the lamp housing 2 and the shaft portion 15 of the lamp lens 3 due to damage, and further, is capable of rotatably mounting the lamp lens 3 on the lamp housing 2 without a backlash.

Furthermore, according to the vehicle room lighting device 1 in the exemplary embodiment, even if a difference between an internal diameter dimension of a shaft hole 23 of a lamp housing 2 and an external dimension of a shaft portion of a lamp lens is reduced to its required minimum by means of two guide protrusion portions 24, a shaft portion 15 of a lamp lens 3 can be positioned easily, reliably, and preciously from an opening portion of the lamp housing 2 to a shaft hole 23, so that the shaft portion 15 of the lamp lens 3 can be rotatably inserted into the shaft hole 23 of the lamp housing 2 without a backlash and the lamp lens 3 can be mounted on the lamp housing 2 without a backlash. In particular, a width between two guide protrusion portions 24 is set at a maximum width in a flange portion 19; is gradually sandwiched from the flange 19 to the shaft hole 23; and is set at a minimum width in a boundary between a first portion 25 and a second portion 26 at the shaft hole 23, so that the shaft portion 15 can be reliably guided to, and positioned at the opening portion of the lamp housing 2, i.e., in a range from the flange portion 19 to the shaft hole 23.

Moreover, according to the vehicle room lighting device 1 in the exemplary embodiment, a guide protrusion portion 24 of a lamp housing 2 is provided so as to be protruded in the direction indicated by a rotary shaft O-O of a lamp lens 3, so that the guide protrusion portion 24 of the lamp housing 2 abuts against the lamp lens 3 in the direction indicated by the rotary shaft O-O of the lamp lens 3 and then the lamp lens 3 can be rotatably mounted on the lamp housing 2 without a backlash.

Furthermore, according to the vehicle room lighting device 1 in the exemplary embodiment, a thickness of an elastic piece 12 of a lamp lens 3 and a thickness of a shaft portion 15 are made substantially uniform by means of a second wall thinning hole 16 which is provided at a central part of the shaft portion 15, so that at the time of ejection molding of the lamp lens 3, a resin can be fed substantially uniformly into the elastic piece 12 of the lamp lens 3 and the shaft portion 15. As a result, the vehicle room lighting device 1 in the exemplary embodiment is capable of preventing a deformation or shrinkage from occurring on a surface of the shaft portion 15, so that: the shaft portion 15 can be formed in a sectional shape of a perfect circle; and the lamp lens 3 can be rotatably mounted on the lamp housing 2 without a backlash.

Still furthermore, according to the vehicle room lighting device 1 in the exemplary embodiment, a shaft hole 23 of a lamp housing 2 can be molded with wall cutting dies 27, 28 instead of a slide die, so that a shaft hole 23 having its elongated depth can be molded. As a result, according to the vehicle room lighting device 1 in the exemplary embodiment, a lamp lens 3 can be rotatably mounted on the lamp housing 2 without a backlash by the elongated depth of the shaft hole 23.

Yet furthermore, according to the vehicle room lighting device 1 in the exemplary embodiment, a roulette 18 is provided on a respective one of a bottom face of a side wall portion 7 of a lamp lens 3 and a top face of a first wall thinning hole 14, so that a sense of uniformity in appearance of a peripheral edge part of the lamp lens 3 can be obtained by means of this roulette 18. In other words, in a case where the first wall thinning hole 14 has not been provided at an elastic piece 12, the roulette 18 cannot be provided at the elastic piece 12. However, according to the vehicle room lighting device 1 in the exemplary embodiment, the first wall thinning hole 14 is provided at the elastic piece 12, so that the roulette 18 can also be provided in the first wall thin hole 14 of the elastic piece 12. While the roulette 18 cannot be provided in a groove 13 at each side of the elastic piece 12, a width of this groove 13 is small so that a sense of uniformity in appearance is disallowed to be lost.

Hereinafter, an example other than the foregoing exemplary embodiment will be described. In the foregoing exemplary embodiment, two shaft holes 23 of the lamp housing 2; and two elastic pieces 12 and two shaft portions 15 of the lamp lens 3 are provided. However, in the present invention, one shaft hole 23 of the lamp housing 2; and one elastic piece 12 and one shaft portion 15 of the lamp lens 3 may be provided.

What is claimed is:
1. A vehicle room lighting device in which a light source is turned ON/OFF by rotationally operating a lamp lens and then making a pushing operation of a push switch, said device comprising:

a lamp housing and the lamp lens which partition a lamp room; and
the light source and the push switch which are disposed in the lamp room, wherein
an elastic piece having an elasticity in a rotary shaft direction of the lamp lens is provided as part of the lamp lens;
a shaft portion is provided as part of the elastic piece; and
a shaft hole through which the shaft portion is rotatably inserted around a rotary shaft of the lamp lens is provided in the lamp housing,
an opening portion which closed by the lamp lens and where the lamp room is partitioned is provided in the lamp housing,
wherein the elastic piece is provided between two grooves which are provided at a side wall portion of the lamp lens, and a first wall thinning hole, having a rectangular cross section, is provided at a central part of the elastic piece,
wherein a second wall thinning hole, having a semicircular shape, is provided at a central part of the shaft portion, and separated from the first wall thinning hole.

2. The vehicle room lighting device according to claim 1, wherein:
the lamp housing is formed in a sectional recessed shape of which one side opens and the other side closes;
the shaft hole is provided at least at either one of edges which are opposite to each other at an opening portion of the lamp housing;
the lamp lens is formed in a sectional recessed shape of which one side closes and the other side opens;
a closed portion of the lamp lens closes an opening portion of the lamp housing and then the lamp room is partitioned;
the elastic piece is integrally provided at least at either one of edges which are opposite to each other at an opening portion of the lamp lens;
the shaft portion is integrally provided in the elastic piece so as to be protruded to an outside in a rotary shaft direction of the lamp lens; and
at the shaft portion, an abutment face is provided which elastically abuts against an edge of the opening portion of the lamp housing when the shaft portion is positioned in a range from the opening portion of the lamp housing to the shaft hole.

3. The vehicle room lighting device according to claim 1, wherein
at a site from an opening portion to the shaft hole in the lamp housing, a guide protrusion portion is integrally provided so as to be protruded to an inside in a rotary shaft direction of the lamp lens,
the guide protrusion portion for guiding the shaft portion to be positioned in a range from an opening portion of the lamp housing to the shaft hole.

4. The vehicle room lighting device according to claim 1, wherein:
the shaft portion is formed in a sectional circular shape; and
the shaft hole is formed in a sectional circular shape by combining a first portion formed in a sectional semicircular shape and a second portion formed in a sectional semicircular shape with each other.

5. The vehicle room lighting device according to claim 3, wherein the guide protrusion portion is provided in one pair at both sides of the shaft hole.

6. The vehicle room lighting device according to claim 5, wherein a width between the pair of guide protrusion portions is continuously reduced from a flange portion of the lamp housing to the shaft hole.

7. A vehicle room lighting device in which a light source is turned ON/OFF by rotationally operating a lamp lens and then making a pushing operation of a push switch, said device comprising:
- a lamp housing and the lamp lens which partition a lamp room; and
- the light source and the push switch which are disposed in the lamp room, wherein
- an elastic piece having an elasticity in a rotary shaft direction of the lamp lens is provided as part of the lamp lens;
- a shaft portion is provided as part of the elastic piece; and
- a shaft hole through which the shaft portion is rotatably inserted around a rotary shaft of the lamp lens is provided in the lamp housing,
- an opening portion which closed by the lamp lens and where the lamp room is partitioned, is provided in the lamp housing,
- wherein the elastic piece is provided between two grooves which are provided at a side wall portion of the lamp lens, and a first wall thinning hole, having a rectangular cross section, is provided at a central part of the elastic piece,
- wherein a second wall thinning hole, having a semicircular shape, is provided at a central part of the shaft portion, and separated from the first wall thinning hole,
- at the shaft portion, an abutment face is provided which elastically abuts against an edge of the opening portion of the lamp housing when the shaft portion is positioned in a range from the opening portion of the lamp housing to the shaft hole.

8. The vehicle room lighting device according to claim 7, a boundary between an exterior face of the shaft portion and the abutment face is tilted relative to the lamp lens.

* * * * *